United States Patent
Arunachalam et al.

(10) Patent No.: US 9,538,261 B2
(45) Date of Patent: Jan. 3, 2017

(54) INTELLIGENT URL SYSTEM FOR RECOMMENDING VIDEO PROGRAMS

(71) Applicant: Peel Technologies, Inc., Mountain View, CA (US)

(72) Inventors: Thirumalai Arunachalam, Santa Clara, CA (US); Balamurugan Krishnan, Daly City, CA (US); Avinash Shetty, San Jose, CA (US); Philip Poulidis, Oakville, CA (US); Leslie Andrew Prock, Edgewodd, WA (US); Siva Subramanian Muthukumarasamy, Santa Clara, CA (US)

(73) Assignee: Peel Technologies, Inc., Mountain View, CA (US)

(*) Notice: Subject to any disclaimer, the term of this patent is extended or adjusted under 35 U.S.C. 154(b) by 0 days.

(21) Appl. No.: 14/455,845

(22) Filed: Aug. 8, 2014

(65) Prior Publication Data

US 2015/0046951 A1 Feb. 12, 2015

Related U.S. Application Data

(60) Provisional application No. 61/863,865, filed on Aug. 8, 2013.

(51) Int. Cl.
*H04N 21/23* (2011.01)
*H04N 21/858* (2011.01)
*H04N 21/658* (2011.01)
*H04N 21/2665* (2011.01)
*H04N 21/231* (2011.01)
*H04N 21/239* (2011.01)
*H04N 21/2743* (2011.01)

(52) U.S. Cl.
CPC ...... *H04N 21/8586* (2013.01); *H04N 21/2393* (2013.01); *H04N 21/23116* (2013.01); *H04N 21/2665* (2013.01); *H04N 21/2743* (2013.01); *H04N 21/6581* (2013.01)

(58) Field of Classification Search
None
See application file for complete search history.

(56) References Cited

U.S. PATENT DOCUMENTS

2003/0118014 A1* 6/2003 Iyer ............... H04N 5/782 370/389
2003/0228014 A1* 12/2003 Alasia .............. G09C 5/00 380/53

(Continued)

*Primary Examiner* — Cai Chen
(74) *Attorney, Agent, or Firm* — Fenwick & West LLP

(57) ABSTRACT

An addressing format, or intelligent Uniform Resource Locator (IURL), is used to direct users amongst content across disparate sources. Information about media content items available across the disparate sources is managed by a server which relates the media content items and the different sources from which a media content item may be accessed in a database. When a user desires to share media content, an iURL referencing the media content is generated for the user to share. When a given user selects the iURL, information about the content sources available to the given user in conjunction with the content referenced by the iURL are processed to determine a configuration of the content sources available to the given user (which often differs from the user having shared the content) to effect playback the media content.

20 Claims, 9 Drawing Sheets

(56) References Cited

U.S. PATENT DOCUMENTS

| | | | |
|---|---|---|---|
| 2007/0266414 A1* | 11/2007 | Kahn | H04N 7/162 725/113 |
| 2010/0199295 A1* | 8/2010 | Katpelly et al. | 725/14 |
| 2013/0042289 A1* | 2/2013 | Park | H04H 20/93 725/115 |

* cited by examiner

Media Content Table 300

| Title | Country | Cast | Release Year | Episode No. | Duration | Popularity | ID | Source List |
|---|---|---|---|---|---|---|---|---|
| Red Dawn | US | Patrick Swayze... | 1984 | | 1:44 | 5 | RD1 | Cable, Sat, NF... |
| Red Dawn | CN | Patrick Swayze... | 1984 | | 1:44 | 4 | RD2 | NF, YT, AMZ... |
| Amanecer Rojo | ES | Patrick Swayze... | 1984 | | 1:44 | 3 | RD3 | Cable, NF, YT, AMZ... |
| Top Gear | UK | Jeremy Clarkson... | 2002 | S1E1 | 1:05 | 10 | TGUK1 | Cable, Sat, NF... |
| Top Gear | AU | Charlie Cox... | 2008 | S1E1 | 1:00 | 5 | TGAU1 | NF, YT, AMZ... |
| Top Gear | US | Adam Ferrara... | 2010 | S1E1 | :45 | 5 | TGUS1 | NF, YT, AMZ... |

FIG. 3A

Network Profile 400

| Device | RX | TX | Device ID | Source List | Output List | Source Mode1 |
|---|---|---|---|---|---|---|
| Controller A | BT, IP | IR, BT, IP | | | | |
| Display | IR, BT, IP | IP | Phone1 | YT, Storage | MR1, TV1 | NA |
| DVR | IR, IP | IP | TV1 | MR1, NF, AMZ... | --- | ON |
| Game System | IP, BT | BT, IP | DVR1 | ComCable, Storage | MR1 | OFF |
| Media PC | IP | IP | xBox | NF, AMZ... | MR1 | ON |
| Media Receiver | IR, BT, IP | IP | PC1 | YT, Storage | MR1 | NA |
| | | | MR1 | Phone1, TV1, DVR1... | TV1 | ON |

FIG. 4

INTELLIGENT URL SYSTEM FOR RECOMMENDING VIDEO PROGRAMS

CROSS REFERENCE TO RELATED APPLICATIONS

This application claims a benefit of, and priority to, U.S. Patent Application No. 61/863,865, the contents of which are incorporated herein by reference.

BACKGROUND

1. Field of Art

The disclosure generally relates to improving user experience when viewing video content items across a variety of sources.

2. Description of the Related Art

Mobile devices, such as smart phones and tablets, have become prevalent in recent years. Given the advances in mobile computing power and far-reaching wireless Internet access, more and more users utilize their mobile devices for a variety of tasks including viewing media content on their mobile devices, researching media content for consumption, and sharing information about media content with other users out of convenience. The media content shared and viewed amongst the users may be available on a variety of source including internet streaming websites or services, streaming on standalone boxes, home media servers, cable boxes, live television digital recording devices (DVR), and the like. However, some media content items may not be available on a particular platform due to copyright, distribution choices, and delivery method, amongst other reasons. Thus, a user receiving information about a particular media content item from another user must subsequently determine where to access the media content and whether he/she has access to the media content. These requirements of the user prevent the rapid sharing and viewing of media content across sources amongst users.

In a specific example, a user watching American Idol via a given television provider that wishes to suggest the video content to a group of friends on a social network may indicate to the group of friends that they should browse to American Idol, to FOX, or a particular channel on their television. In the first case, a user wishing to view the video content corresponding to the recommendation must determine which channel American Idol is on, i.e., FOX, or another network carrying the programming in another region. Similarly, in the second case, a user must determine which channel corresponds to FOX. In the latter case, the channel for FOX may differ among the group of friends according to television provider or geographical location. In any instance, it's likely that several users in the group of friends may have some difficulty in conveniently finding and then viewing the suggested content. Extending this example to sharing content worldwide causes further issues through scheduling issues across time zones and countries, differing channels providing the content (e.g., FOX in the U.S. vs SKY in the U.K.), and language barriers.

BRIEF DESCRIPTION OF DRAWINGS

The disclosed embodiments have advantages and features which are readily apparent from the detailed description, the appended claims, and the accompanying figures (or drawings). A brief introduction of the figures is provided below.

FIG. 3A illustrates an example embodiment of a media content table for facilitating sharing of media content between users that access disparate sources to view shared media content.

FIG. 4 illustrates an example embodiment of a user media network profiler table.

DETAILED DESCRIPTION

Figure 1:
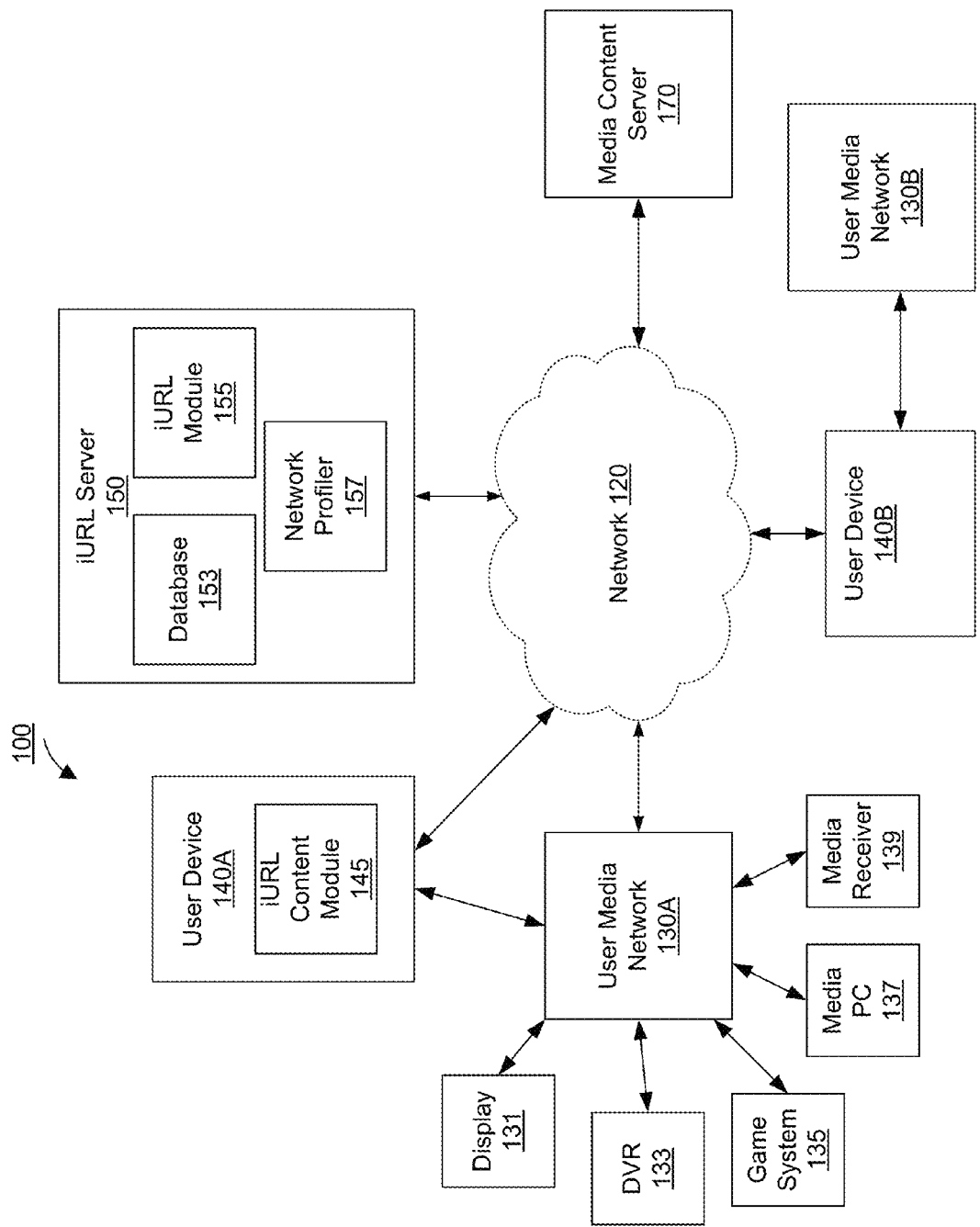
FIG. 1 illustrates a high-level block diagram of an example environment for improving user experience when sharing media content available from disparate sources.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The internet utilizes a ubiquitous addressing format, known as a Uniform Resource Locator (URL), to direct users amongst accessible content. By extending a familiar format of content sharing online to media content items available across disparate media content sources (which include both online or offline sources), and managing users' networks of disparate media content sources, user experience when sharing and accessing shared media content is improved. In addition to improving users' experiences associated with sharing and accessing content across disparate media content sources, a variety of associated services may be provided to further enhance the experience.

In one embodiment, an intelligent URL (iURL) scheme is disclosed and described to link media content across the disparity of sources utilized by users to access media content items. A remote user device managing the content sources directly or indirectly monitors the status of media content playback within a user's media network to identify the media content being played and determine the source of the media content being played within the user's media network. In turn, the user may utilize the user device to transmit the status of media content playback to an iURL server that generates an iURL corresponding to a configuration of the user's media network and status of media playback within the user's media network. For example, the generated iURL may describe a configuration of the user's media network enabling playback of the media content, the media content being played, a timestamp in the timeline of the media content, and other details described herein. Alternatively, the user device may determine the iURL directly in a similar fashion. In either instance, the user may subsequently share the iURL, such as through a social network, directly through text or email, a proprietary application etc., with other users that utilize their own remote user device and media networks to view media content. When one of the other users having registered with the iURL service selects the shared iURL through their user device, the iURL is parsed and analyzed to identify corresponding media content most appropriate for viewing on the other user's media network. By generating an iURL compatible with the other user's media network, the corresponding media content and a configuration of the other user's media network enabling playback of the corresponding media content may be identified to the other user's device. The other user's device then configures the other user's media network based on the iURL to playback the corresponding media content. Through the use of a user device to control media sources within a media network, the media sources themselves may be agnostic to the existence of the iURL but the user may still participate in the service. Companion services such as video preview for video content and viewing from a particular time period may be conveniently provided to a user through the iURL system as related media content items are identified across the range of media sources available to the user. In some embodiments, an application on the user device may utilize an iURL and communicate with an iURL server to identify, and provide associated services. Further, the application may interface with the user device to communicate with the various media sources on the user's media network to configure the media network according to an iURL shared by another user to enable playback of a particular media content item and monitor the status of media content playback within a user's media network for generating an iURL to share with other users.

Embodiments of the system may include example components including a global database of entries uniquely identifying video media items such as television (TV) shows, movies, and the like. The database may store unique references to country and language specific variants of media content items. A media content item as used herein may refer to a specific unique entry in the database (e.g., the movie "Red Dawn" in a specific language) or the family of entries associated with a media content item (e.g., "Red Dawn" in any language). A unique entry may include information describing specific characteristics (e.g., list of cast members, content type, release year, etc.) of a version of a media content item that differs across the overall family of entries for the media content item and entry specific attributes (e.g., episode number, duration, popularity, unique ID, and source listing). Other structures of the database may also be realized, for example a tree structure may include nodes (e.g., a media content item having several unique version) identifying information common to a number of leaves (e.g., a unique version of the content item with a unique ID number) each representing the unique versions of the parent media content item.

The media source listing for each entry may be updated based on known information for media sources monitored by the service or otherwise compatible with the iURL system. For example, a second or the same database may include channel lineups and program schedules for TV content and listings for streaming services such as NETFLIX or AMAZON PRIME, and address of streaming content commonly available on the internet such as online YOUTUBE or VIMEO video. Information such as availability of a media source in a specific geographic location may be monitored (e.g., a media content item was retrieved by a iURL server or user device in a particular country) or retrieved from a $3^{rd}$ party (e.g., channel lineup) based on the geographic location of iURL system users. In other words, at any given time, the iURL system may identify the media content item played on the media network of any given user within the system or when a particular show in the near future may be aired or available for viewing for a particular user within the system.

The user device functions as a universal remote control for the media network of the user. The user device, for example, may include a number of communications technologies compatible with the media sources and/or the devices on the user's media network. The user device may issue commands to a particular media source directly or through the entertainment network (e.g., via a hub or other intermediary device). Additionally, an application on the user device may identify status information about the media network such as user media content selections, current media playback, and source for the media content within the media network based on the commands issued while utilizing the user device and/or user media selections. The application may transmit the status information to the iURL server for processing and/or process the status information at the user device, depending on the embodiment.

In accordance with embodiments described herein, a user, regardless of geographic location or media network configuration, may recommend media content from their user device with an iURL (e.g., http://www.peel.tv/showname/season/episode/ABC67HH) while watching the show on cable TV, or any other available media source known and tracked by the iURL system on the user's media network. A given user receiving the recommendation and having a different geographic location and/or different media configuration may select the iURL or accept the recommendation to automatically watch the media content, if the media content is available on any of the media sources within the given user's media network. In one embodiment, the iURL system resolves iURL corresponding to the recommended content to a specific entry within a media content table. Related entries, e.g., within a family of the media content item, are identified and the media sources from which they may be accessed are referenced with information about the given user's media network who selected the iURL. A best entry corresponding to a media content item available for playback within the given user's media network (which may differ from the entry the selected iURL resolved to) and corresponding media source for accessing the media content item within the given user's media network is determined for the given user and a configuration for the given user's media network enabling playback of the media content item along with any information for playing the media content item are transmitted to the given user's device. In some embodiments, this information may be transmitted in the form of a generated iURL compatible with the given user's media network. The given user's device, in turn, issues commands to effect any change in the configuration of the media network necessary to playback the media content item on the correct source.

Multimedia Environment

Turning to FIG. 1, a high-level block diagram illustrates an example environment 100 for improving user experience when sharing media content available for disparate sources. The environment 100 may include components of an iURL system such as an iURL server 150, and user devices 140 for managing user media networks 130.

A media content server 170 may provide streaming content over a network 120 to a user device 140 or to a user media network 130. Other media content providers not shown may include operators of cable, fiber, satellite, or clear-channel wireless broadcast networks and their related technologies. The media content is subsequently received, decoded, and presented by, for example, one or more user media sources such as a display 131, DVR 133, gaming system 135, media personal computer (PC) 137, media receiver 139 and the like, coupled a user media network 130. A media network 130 comprises the coupling, control, and defines the overall configuration of the user media sources 131, 133, 135, 137, 139, etc. The user media sources may also accept physical media comprising media content items such as video files or media, access the media content items, and optionally store the media content items to a local memory (not shown).

The iURL server 150 catalogs media content items available to be provided by the media content providers to the media sources 131, 133, 135, 137, 139, etc. and manages relationships between the media content items in a database 153. For example, the database 153 may contain entries for TV shows, Movies and other media content items. Each entry in the database 153 also contains relevant metadata information for the media content item including, for example, but not limited to: title, description, spoken language, subtitled languages, length, year of release, cast, crew and images.

Entries in the database 153 may span geographic boundaries in order to identify families of related media content items. For example, the database 153 may maintain relationships or references between international versions of the same show or versions of the same show provided in different languages. In one embodiment, the iURL server 150 analyzes content items and corresponding entries to form the relationships in the database 153. For example, there may be two versions of the show "Madmen" one from US and another from Europe (EP), the iURL server 150 may identify the separate entries in the database for the US and EP content items and relate these two content items in the database such that when a US user generates an iURL corresponding to the US version and shares the iURL with an EP user the EP version may be referenced for playback to the EP user. Several example embodiments for relating entries are described below:

Title Match and Year of Release Match: If the characters of the title match and the release date match, the entries may be related.

Year of Release, Duration and Cast Match: When the title does not match literally, if the duration of the show, year of release and cast and crew information match, the entries may be related.

Seasons and Episodes Info Match: If the number of seasons and the number of episodes available in each season for different entries may be matched to relate two entries.

Popularity Match: The iURL server 150 may derive popularity metrics for the different entries based on share rate, number of views, and general amount of user activity associated with a particular content item. In turn, the popularity of two content items may be used to determine whether they are related or not. For example, a recently released content item with low popularity matching a show with high popularity may be discarded as a potential match.

The database 153 also stores scheduling information for each content item entry. For example, the iURL server 150 may retrieve and store scheduling for channels that are available in TV network broadcasts in multiple countries in addition to on-demand or other catalogs of media content items available from media content providers such as NETFLIX. For example, the database may contain the information on what networks are broadcasted/transmitted by a particular provider and the channel numbers for each network carried by the particular service provider. For example, FOX could be broadcast on channel 2 for DIRECTV in the US, channel 703 on COMCAST in the US, etc. The database may store this information in a variety of different ways and is described in more detail with reference to FIG. 3.

The iURL server 150 includes an iURL module 155 for generating and/or parsing iURLs to identify media content items in the database 153. The iURL scheme represents any media content item (e.g., video/audio/interactive) in a way that can be accessed to begin playback instantly on a user device 140 or devices within a user's media network 130 as long as the user's media network can access the content referenced by the iURL. For example, the iURL module 115 may generate an iURL that the user device 140B may transmit to a second user device 140A (i.e., sharing the iURL). For example, the user device 140B or iURL server 150 may publish the generated iURL to a social networking site accessible by both user devices 140. The iURL may also be exchanged between the devices by other means. In either instance, a user utilizes user device 140A to select the iURL and thus playback the media content item recommended by user device 140B.

The iURL module 155 may include an HTTP server or similar functioning service to receive a connection request from user devices 140 that select an iURL. For example, when an iURL is selected on user device 140A, the iURL module 155 receives a connection request from user device 140A at the destination of the iURL. The connection request identifies the user device 140A to the iURL module 155 and the destination pointed to by the iURL indicates the shared content (e.g., shared by device 140B) the user of device 140A desires to view. Alternatively, the user device 140A may transmit information including the iURL to the iURL server 150 directly, in which case the iURL module 155 identifies the user device 140A from the transmitted information and utilized the received iURL to identify the corresponding media content item in the database 153. The iURL module 155 receives the iURL or connection request at the iURL and resolves the unique content entry in the database 153 associated with the iURL. The configuration of the user media network 130A may differ from that of user 130B, and thus, the origination playback sources and destination playback source does not have to be the same. In other words, the user 140B can send and iURL recommendation corresponding to a recorded show on a DVR and user 140A may watch it on the display 131 through an online video streaming service, or another source based on the destination user media network 130A.

In order to resolve the iURL to a particular content item for any particular user's media network 130A, the iURL server 150 may include a network profiler 157 that stores the configuration of the user's media network 130A. Further by storing the user media network configuration 130B of user 140B, an iURL corresponding to a particular content item may be generated based on the status of the user media network 130B. Specifically, user devices 140 may include an iURL content module 145 to monitor and report the status of a media network based on issued commands and/or feedback from the media network. For example, the user device 140B may issue a sequence of commands to turn on a display, DVR, and receiver coupled to the user media network 130B. As the user browses through channels with the user device 140B, the current channel may be tracked and reported along with the current device status (e.g., display, DVR, and receiver on and current channel/mode/application being used thereby to enable current playback of media content). The network profiler 157 may, in turn, determine the content item being viewed by the user on media network 130B based on the status of the user's media network 130B. The iURL module 155 uses the determined information to generate the iURL corresponding to the content item. In other embodiments, an iURL content module 145 on user device 140B may generate an iURL based on the status information. For example, some embodiments of the iURL content module 145 may include a network profiler with configuration information for media network 130B and database storing information about content items available on the user's media network 130B—thus, the database on the user device 140B need not store information about content items from sources not available to the user's network 130B.

In some embodiments, when a user browses to an iURL on their user device 140, the network profiler 157 resolves the appropriate configuration of the sources coupled to the user media network 130 required to play the content item (or content item in the family) corresponding to the iURL. Based on the status of the user's media network and configuration thereof, the network profiler 157 may intelligently determine which combination of devices and media sources to utilize to play the content item for the user. For example, the network profiler 157 may determine which configuration of the user's media network provides the best viewing experience such as whether the content item may be presented commercial free, in high definition, or utilizing the combination of devices currently being used based on status information provided by the user device 140. When a content item corresponding to the iURL is not available to a particular user's media network 130, the network profiler 157 may identify and notify the user of new media sources or services the user may sign up for to access the content or indicate a future broadcast date and optionally set a recording.

In some embodiments, the network profiler 157 maintains a virtual representation of the users' media networks 130 and the interconnections of devices therein. For example, a user may register with the iURL server 150 to provide configuration details about their user media network 130 to the network profiler 157. For example, the registration process may include providing information about which media content providers provide content to source devices 131, 133, 135, 137, 139 etc. within the user media network 130, couplings of the source devices within the user media network, and device information (e.g., model number, manufacturer, etc.) for the source devices. In some embodiments, the devices themselves may be scanned or otherwise accessed through an interface using the user device 140 and/or network profiler 157 to identify local media content. Through the registration process, the network profiler 157 stores the configuration of any number of sets of TVs, the type of TVs, the specific cable providers, the type of set top box the person may have and any other devices part of the user media network 130, which in turn may be updated as necessary through the user device 140 as components or services are added or removed. A user media network 130 may include a number of separate configurations such as a living room and family room which may each be treated as separate user media networks 130 based on the device the user device is current controlling and the media devices' status. The configuration information provided for the user network to the profiler 157 is processed to produce a virtual map indicating how the source devices within the user media network 130 interact with each other to playback media content items available locally and from content providers.

The network profiler 157 may further customize a configuration based on the user device controlling the user media network 130. For example, the network profiler 157 may store configurations supporting a specific user and a number of family members, the different houses they own or rent and the multiple rooms in these houses in which they consume entertainment.

As described above, the network profiler 157 may store status information for a given user media network 130. The status information may be further broken down in a similar fashion to the user media network 130; into the specific groups of devices in a particular room or house a user desires to control with a user device 140. The status information may be stored in a table listing the various media devices coupled to the user's media network 130 and the couplings and dependencies thereon for playing media content on a particular media source such as source input number or whether a system depends on another for video or audio capabilities. The profiler 157 further stores information on various scenarios and contexts on which the entertainment system can be used and the various states the various devices may operate in. For example, if the user has three different contexts in which he uses his living room devices, "DVD Viewing", "Live TV", and "Music". Each of these contexts may require source devices such as display devices, audio devices, and devices receiving content to have a different status, such as "ON" and a channel or selection such as a specific input channel or cable channel to provide the specific experience. The network profiler 157 may store these contexts with the configuration of the user network 130 such that a media content item having a given context causes the profiler 157 to automatically select a preferred user configuration of the user network matching the context and determine any commands (e.g., based on current status information for the user network) to issue to place the network in the configuration that achieves the specific context. The status information received for the user media network may describe a current context or available contexts that are more easily achieved for presenting a media content item. For example, if a show is available on on-demand cable and through an internet streaming service, and the user is currently watching TV through the same cable source, presenting the media content item through the on-demand cable source may be preferred to an online service such as Netflix provided via a source device in the off state as no other device status need be changed.

In some embodiments, a user device 140 may include the network profiler 157 and/or possess functionality of the network profiler for determining status information and/or generating the codes and protocols for communicating with media sources on the user media network 130.

In one embodiment, the user devices 140 are computing devices with network capabilities. Oftentimes, for example, the user devices 140 are wireless communication enabled mobile computing devices with display or display enabling (e.g., providing for display) capability. The user devices 110 as mobile computing devices may include laptops, netbooks, tablets, smartphones, smart telephones, personal digital assistants (PDAs), or media devices such as ROKU, APPLE TV, or AMAZON FIRE. While only two user devices 140A and 140B are illustrated in FIG. 1, the environment 100 may include thousands or millions of such devices for conveniently sharing content.

As shown in FIG. 1, the user device 140A includes an iURL content module 145. The iURL content module 145 may facilitate control over a user media network 130 through the use of codes and other protocols available to the user device 140 to control devices coupled to the user media network 130. In some embodiments, a hub or other device may be used to extend the functionality of the user device 140 beyond the protocols natively at its disposal. Example protocols may include Bluetooth, infrared, IP addressing, and the like. As the user device 140 interacts with devices on the user media network 130 to effect commands, the iURL content module 145 may track the status of the various devices based on the commands issued. For example, the iURL content module 145 may track a current television channel, whether a device is on or off, and selections made on, or through, the device such as media content items and applications (e.g., NETFLIX, ESPN streaming, on-demand, etc.) on sources such as an MICROSOFT XBOX, SONY PLAYSTATION, or a set top box/DVR. Additionally, the iURL content module 145 may detect selections of an iURL on the user device 140 and interface with the iURL server 150 to parse the iURL and determine commands for controlling the devices on the user media network 130 to present the media content item desired for playback by the user. In one embodiment, the iURL content module 145 stores a table of commands and their function that corresponds to the media devices coupled to the user media network 130. The commands may also be pushed to the user device 140 from the iURL server 150 which may store the commands corresponding to the user's media network 130 at the network profiler 157.

In some embodiments, the iURL content module 145 may store a history of watched or previously watched content such that the user may simply pick up from the previous playback location to continue playback of the content. The history and current playback of content items may be stored as iURLs which may correspond to visual tiles displayed on the user device 140 by the content module 145. When the user takes the user device 140 to another location, or away from the user media network, the user device 140 may retrieve the content itself if the content is available to the user device 140 or coordinate playback in another room or location within the media network in which the device has been relocated to. Further, the iURL content module 145 may receive and display video clips and other information associated with an iURL generated by the iURL server 150. For example, the user may make a selection through the iURL content module 145 in association with an iURL retrieve a preview of the content item, and only after watching the preview of the content item, choose to select the iURL for playing the content item through the media network 130. In some embodiments, the preview may have their own corresponding iURL to facilitate ease of management and ubiquity amongst the users across geographic regions and content providers.

The iURL server 150, user devices 140, display 131, DVR 133, media content server 170, media PC 137, game system 135, media receiver 139 etc. may include one or more of the components and functionality described in detail with reference to FIG. 2.

Computing Machine Architecture

Figure 2:
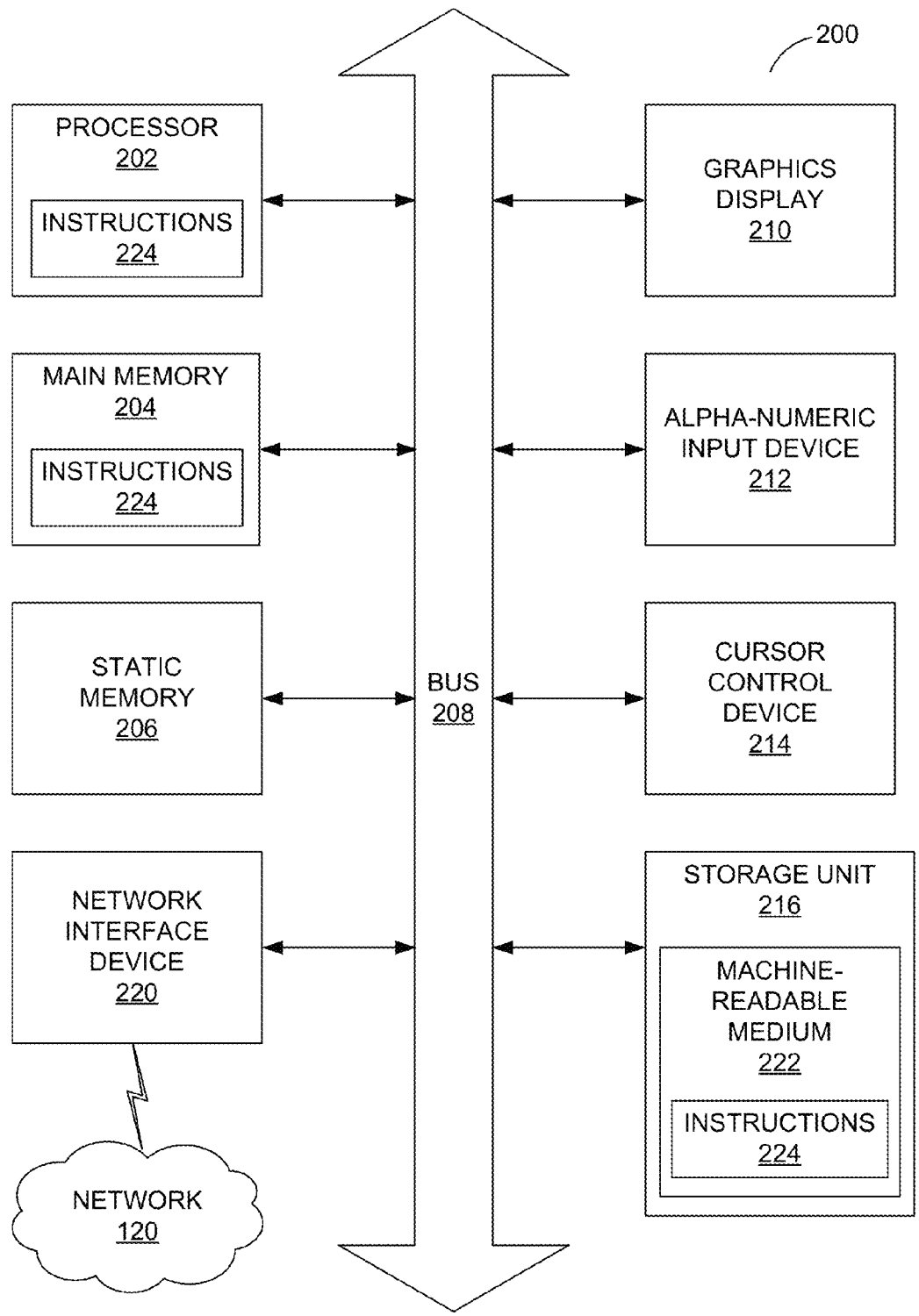
FIG. 2 illustrates an example embodiment of components of an example machine able to read instructions from a machine-readable medium and execute them in a process or controller.

FIG. 2 is a block diagram illustrating components of an example machine able to read instructions from a machine-readable medium and execute them in a processor (or controller) to implement the disclosed system for on-demand real-time network monitoring and subscriber identification. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment. It is noted that the computing system 200 configuration described in FIG. 2 can correspond with the mobile computing devices referenced in FIG. 1.

The machine may be a server computer, game system, television display, a client computer, a personal computer (PC), a tablet PC, a set-top box (STB) such as a DVR, a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 120 via the network interface device 220. It is noted that the instructions 224 can correspond with the functional modules, e.g., 145, 155, 157, described in FIG. 1.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Example Storage and Identification Architecture

FIG. 3A illustrates an example embodiment of a media content table 300 for facilitating sharing of media content between users that access disparate sources to view shared media content. For example, the media content table 300 may be stored in database 153 of an iURL server 150 of FIG. 1. As shown, the media content table may store entries for media content items such as "Red Dawn" and "Top Gear". Metadata for each entry may include title, country, cast, release year, episode number, duration, and popularity measure. As shown, the title may differ between countries, for example, "Red Dawn" dubbed over in Spanish (Spain—ES) is known as "Amanecer Rojo" in contrast to the English title as noted in the US, Australia (AU) and United Kingdom (UK). In another example for "Top Gear", the same title for an entry may correspond to different programs entirely. When lacking a title match and year of release match, a year of release, duration and cast match may be performed as often times the cast names are not translated and the duration is unchanged so that the entries may be related. For example, a user in the US selecting an iURL corresponding to Amanecer Rojo shared by a user in Spain may be directed to the U.S. version. Additionally, other combinations of factors may be used in the case of "Top Gear" to distinguish between seemingly related entries. For example, while the title and episode number match, a programming season and particular episodes may be distinguished by factors such as duration and popularity. In one example, a new episode of "Top Gear" may be released, if few people watch the episode, and "Top Gear" UK is very popular, it may be inferred that the new episode should be related to either the Australian or US version. In turn, other factors such as the number of seasons and the episodes available for different entries may be matched to relate two entries.

The media content table 300 also illustrates a unique ID associated with each entry. The ID uniquely identifies each content entry within the table and may be formatted to indicate families of related entries through a common formatting.

The media content table 300 also illustrates a source list for each entry. The source list describes the availability of a content item on a particular source. Example source providers include Cable (e.g., COMCAST, VERIZON FIOS, or COX), Satellite (e.g., DIRECTV) (Sat), NETFLIX (NF), YOUTUBE (YT), AMAZON PRIME (AMZ). The source list may be updated to describe current or near future availability of the content item corresponding to the entry.

Figure 3B:
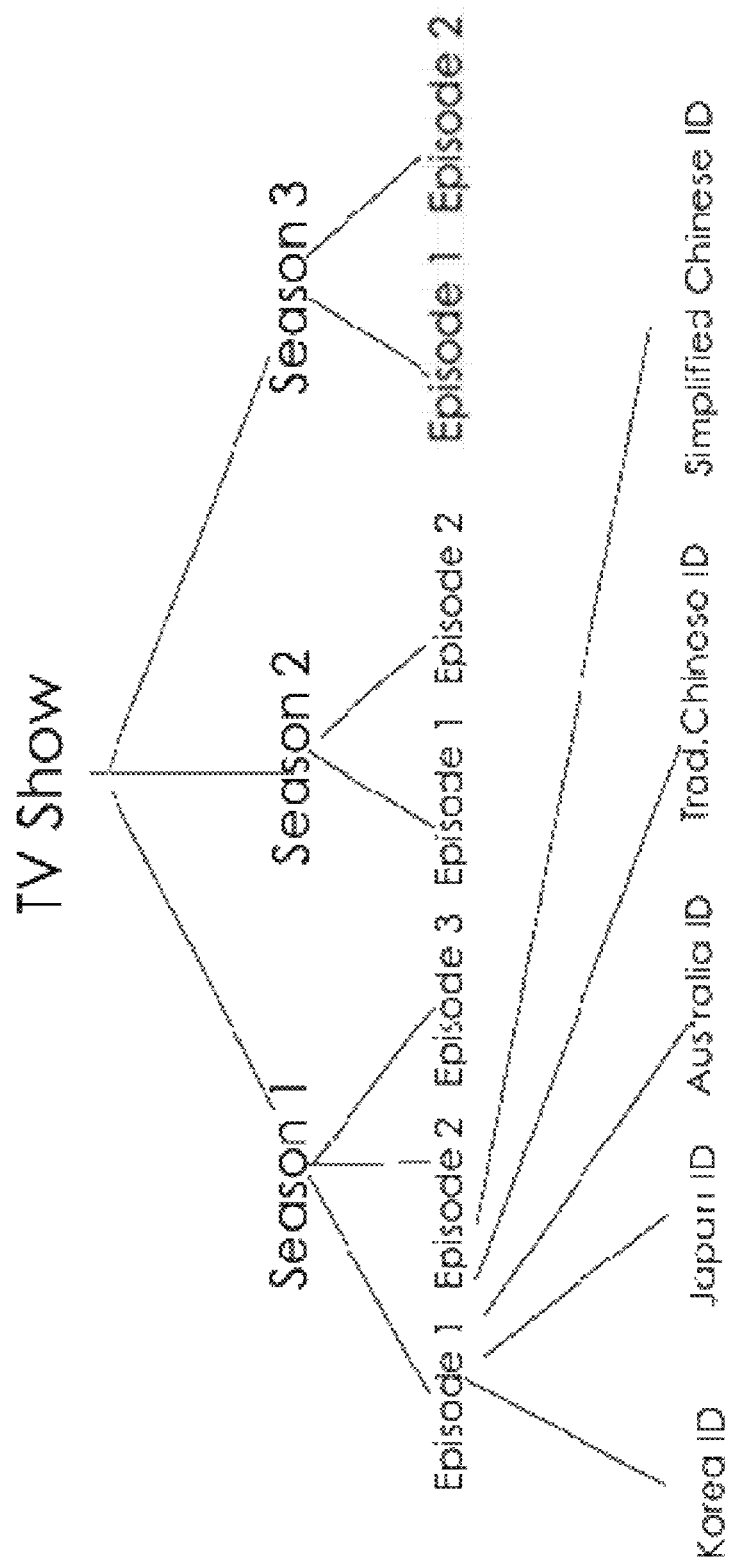
FIG. 3B illustrates an example embodiment of a mapping of media content items.

FIG. 3B illustrates an embodiment of an example of mapping relationship between media content items to generate unique ID's for the entries. A number of entries may have common information corresponding to the show and season, but each have a unique ID corresponding to their geographic origin and associated language (which may differ between each content item based on title and/or spoken language). For example, as shown, a given TV show has information common to a number of seasons of the show, such as seasons 1-3. Likewise, episodes within a season have common information. A given episode, such as episode 1 of season 1 may be dubbed or include subtitles for different languages which would yield separate entries for media content items corresponding to the episode in the database. For example, episode 1 of season 1 may be dubbed in Chinese (China—CN), Korean (Korea—KR), Japanese (Japan—JP), and so forth resulting in separate entries for each content item having a different dubbed soundtrack.

Figure 3C:
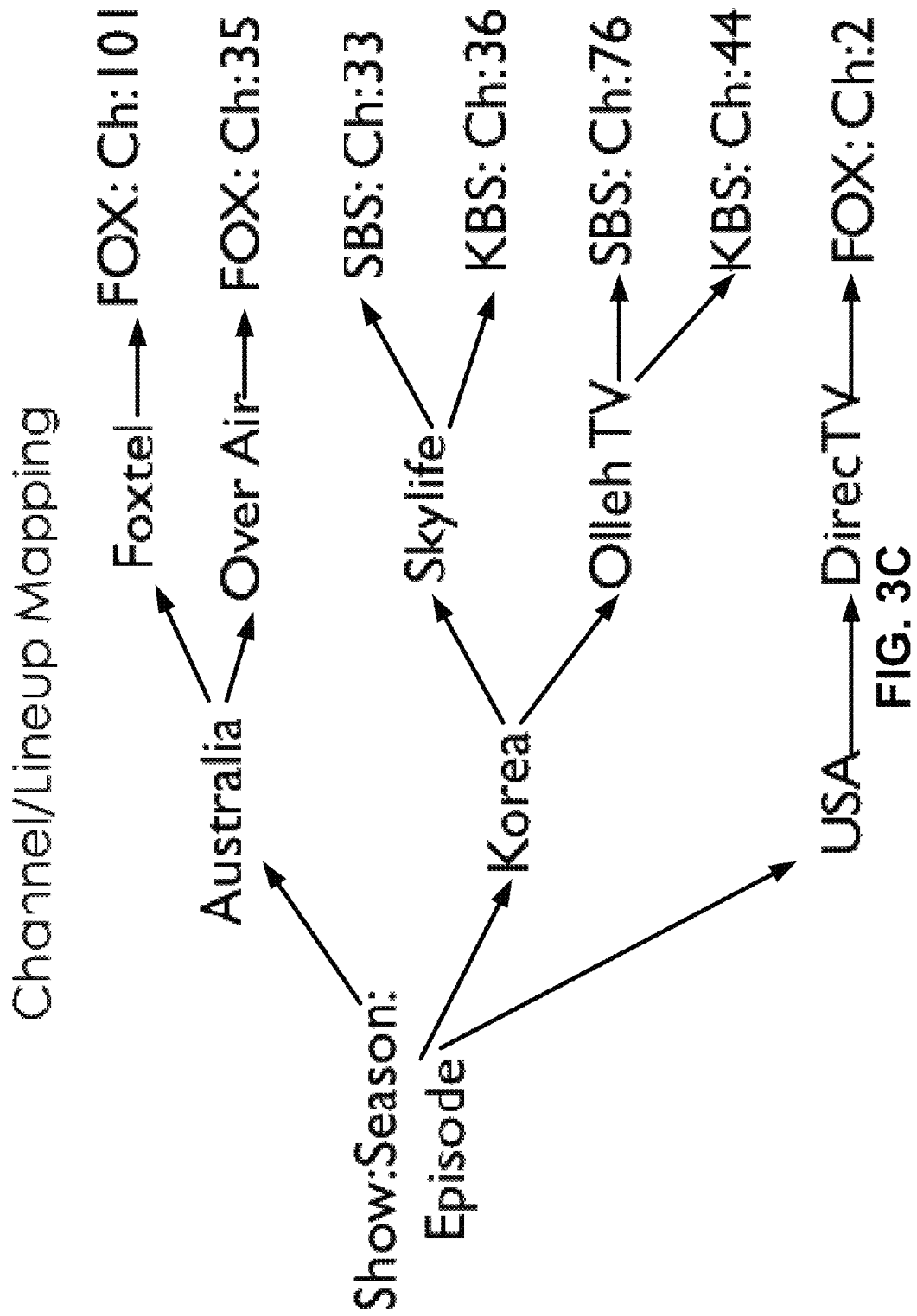
FIG. 3C illustrates an example embodiment of a mapping of disparate media content sources to a media content item.

FIG. 3C illustrates an embodiment of an example mapping of disparate media content sources to a media content item. As shown, different geographical areas may have different sources that may further require distinct entries in the database, even among the same country. Accordingly, a postal code or global positioning system (GPS) location associated with the user device 140 or the user's media network may be assessed to determine the correct source for generating an iURL or parsing the iURL to determine a source and corresponding configuration of the source (e.g., a particular channel for broadcast TV content) for displaying a referenced media content item. Similar mapping may be performed across other content sources such that, for example, all sources including streaming sources are identified for a media content item identified within the database.

FIG. 4 illustrates an embodiment of an example network profiler table created by the iURL server. The network profile table 400 illustrates an example configuration of source devices as coupled to a media content network and the content provider sources available to each device. Controller A may correspond to the user device 140A of a first user utilizing the system, display to display 131 and so on. Receiving (RX) and transmitting (TX) capabilities and associated commands for each may be stored in the table for each device. Accordingly, based on the listed communications capabilities, one device may communicate with another according to the commands listed for a given communications protocol. For example, the user device 140 may communicate with devices capable of receiving Bluetooth (BT), infrared (IR) and internet protocol (IP) commands. Available commands in the table may then be used by the user device 140 to effect the desired function of the device. A source listing for each device may indicate the content source providers the device may access. The source listing may also include subscription information for subscription packages, for example, a movie package (e.g., HBO, SHOWTIME, ENCORE, STARZ), a sports packages (e.g., NFL SUNDAY TICKET, NHL CENTER ICE, ESPN, BTN, FOXSPORTS), etc. for a given source (e.g., COMCAST XFINITY, DIRECTV, or generally as ComCable) to indicate the level of access the user network has to provider content on a particular source device. The source list for a source device may be updated to describe updates to user registration or cancellation with a content provider or service. Also shown in the table is a device ID of the devices on the user's media network. The source list may also be used to indicate a given input channel required to utilize a particular device. The output list indicates any dependencies of a source device. For example, the output list may indicate the devices that may (or must) be activated within the user media network 130 in order to effect a specific function on another device. For example, the DVR, game system, and media PC may depend on the media receiver MR1 to be on in order to present media content, the media receiver in turn must be configured to a specific input channel based on the source list to receive the media for presentation on the TV1 and so forth. A source mode indicates the status of a particular device. For example, a source model may indicate the current status of a device as ON, OFF, or NA (e.g., unknown). Additional source modes may indicate the preferred status of each device for a context of the media network to present particular types of media content as described. Thus, for example, when playing music content the display may be turned to an OFF state. The status information may be used by the iURL server to best determine a sequence of action for transmitted commands the various media sources to present a content item from a particular media source provider.

Figure 5:
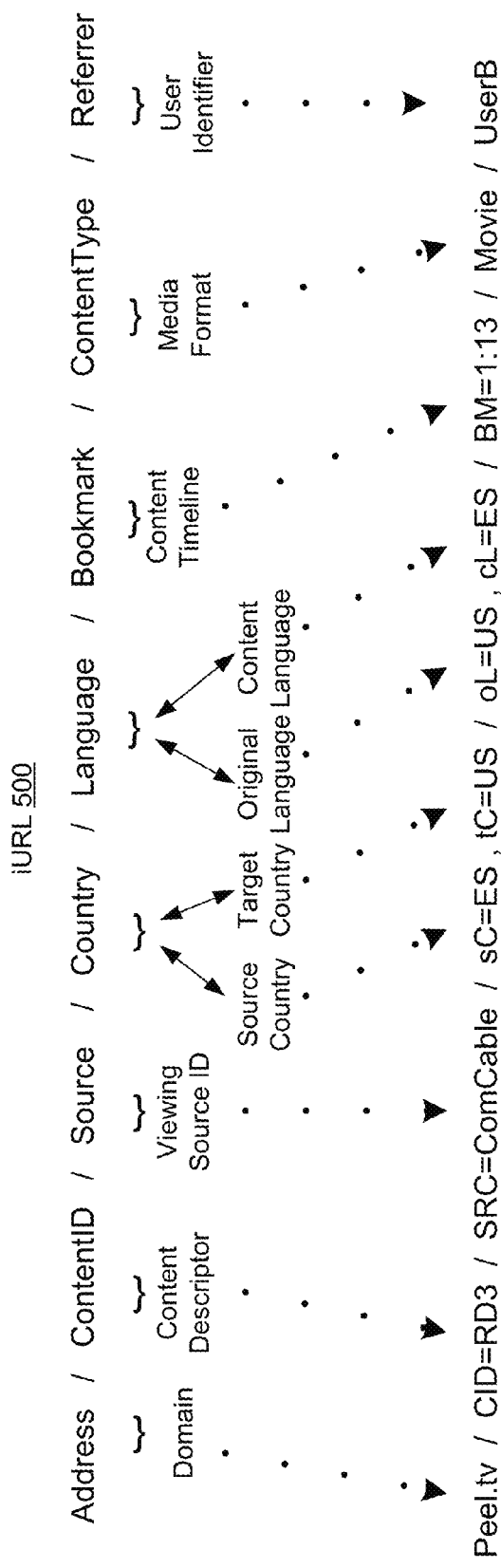
FIG. 5 illustrates an example embodiment of an intelligent Uniform Resource Locator (iURL) scheme for identifying video content items.

FIG. 5 illustrates an example of an iURL scheme for identifying media content items. The iURL may be sectioned into component parts that may further hashed or encoded.

Any media content such as audio/video/game content can be represented in iURL format. In the most simplest form it can be constructed by using name of the program such as peel.tv/friends, however there are several optional parameters that can be used in the representation:

ContentID, the iURL may comprise a direct reference to the content entry corresponding to the recommended item or family of content entries. For example, ContentID may be the program "name", which means the content information passed is the name of the show or content. But ContentID may alternatively be the uniqueID of the content item itself.

The source lists the content provider used by the user sharing the iURL to view the content, examples of Address (e.g., that of iURL server), ContentID and source include
peel.tv/SH009290280000?type=ID&idsource=ComCable
peel.tv/A12ad24?type=ID&idsource=NETFLIX
peel.tv/vA12ad24fg?type=ID&idsource=YOUTUBE
peel.tv/1212413?type=ID&idsource=DIRECTV Country may include the source country "sC" and optionally a desired target or destination country tS.

Language may include origin language oL (e.g., English) and content language cL (e.g., if dubbed in Spanish). In one embodiment, country fields are ISO 2 digit country codes. tCountry stands for target country where the content is meant to be played back. If this option is not specified then peel intelligent parser will dynamically determine the tCountry based on the user who is accessing the shared iURL. sCountry stands for country where the content was created. If this option is not specified, the iURL module will choose the correct show based on popularity of the content.

Bookmarks denote a specific location in the content item either for sharing with another user or picking up the content from where it was left off. The bookmark may include (not shown) absloc to describe timeline position in absolute seconds from start of the program and chapter for denoting timeline position in content with chapters or track, or to denote content with bookmarks maintained by the iURL system to crowdsource and mark important times or popular durations (e.g., 1:13-2:57) in media content.

Contenttype can optionally specify if the content is movie, audio, tvshow, game or short or longform online video for determining a context for use media networks.

Referrer indicates the person sharing the iURL and thus the content item. The referrer ID may be used for sharing or for rewards and separate indicate the mode of sharing such as FACEBOOK, TWITTER, iURL sharing amongst members, email, etc. Referrer information may be optionally displayed on the receiving user device based on a flag value.

Figure 6A:
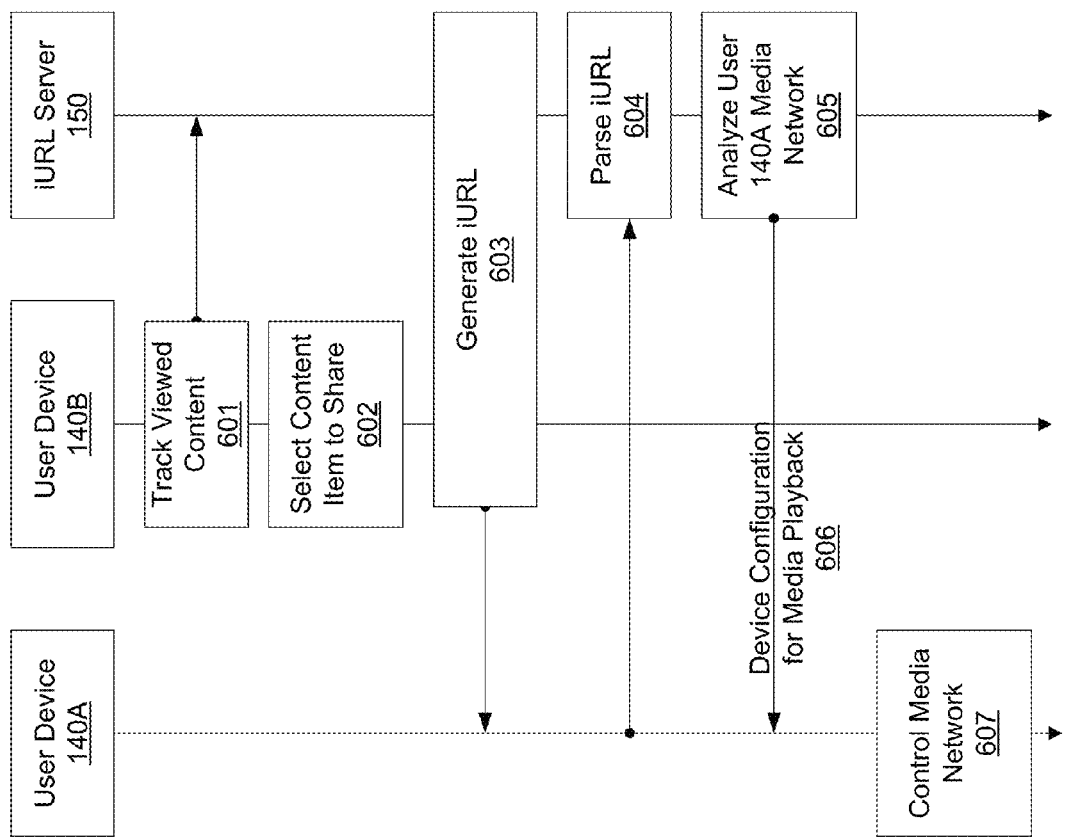
FIGS. 6A and 6B illustrate example interaction diagrams of example methods for enabling the sharing of media content with an iURL.
Figure 6B:
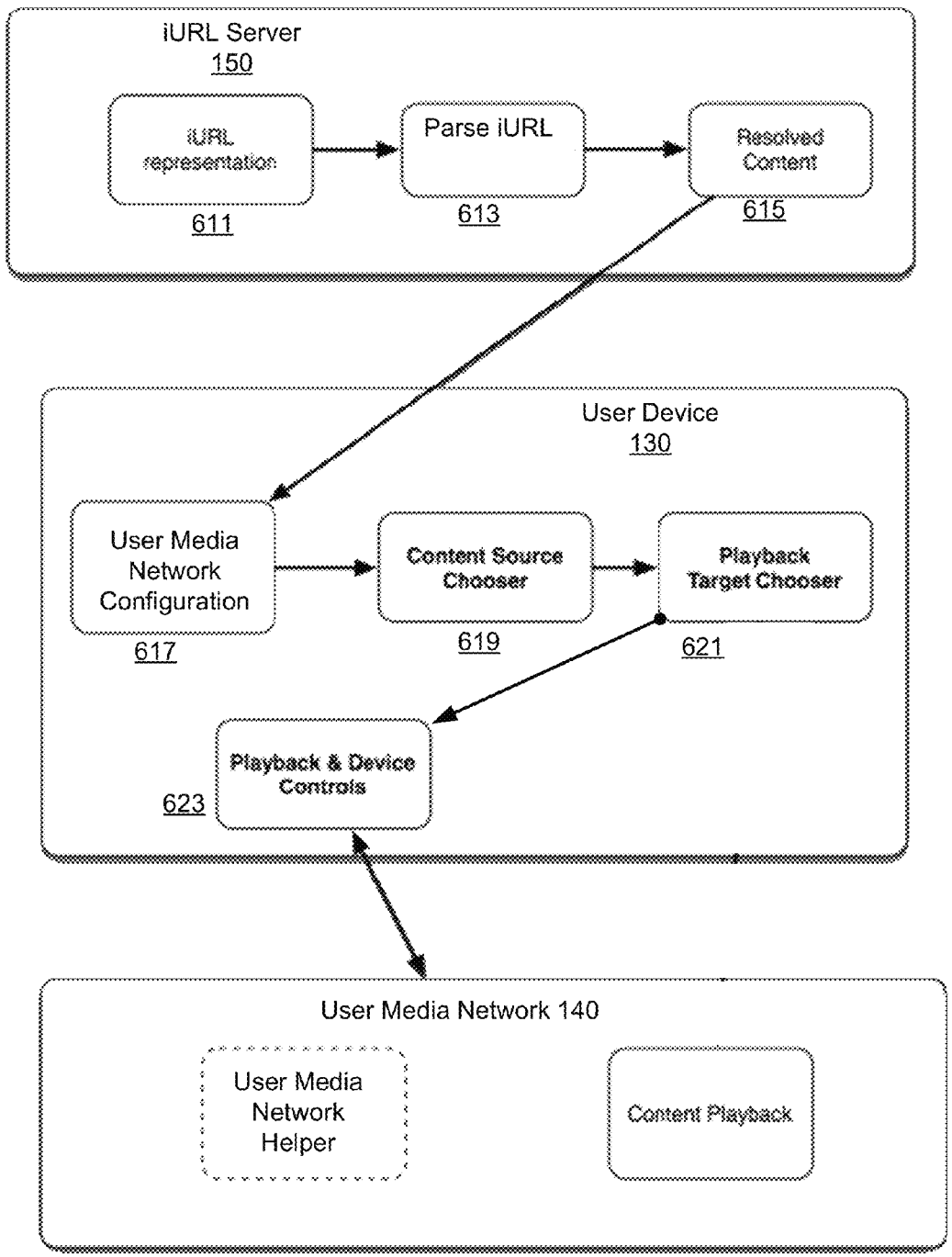

FIGS. 6A and 6B illustrate interaction diagrams of example methods for enabling the sharing of video content items with an iURL. In accordance with the aforementioned description, the user device 140B in FIG. 6A may track 601 media items viewed on the media device network 130B of the user and optionally provide device status and selections to the iURL server 150. The user device 140B may subsequently select 602 a content item to share to another user. The item may be that currently viewed using the user media network 130B and indicated in an application executing on the user device, or another content item the user 140B wants to share. The iURL server 150 receives the selection 602 of the content item for sharing with other users and generates an iURL 603 referring to the shared content item. In some embodiments, the user device 140B itself may generate the iURL.

The iURL server 150 subsequently receives a request from another user device 140A having selected the shared iURL. In turn, the iURL server 150 parses 640 the iURL to determine content referenced by the iURL. The iURL server 150 then analyzes 605 the media network 140A corresponding to the user device to determine sources having a version of the referenced content item available to the user 140A. The version may differ due to language, location and other factors that enhance the user viewing experience. A configuration 606 of the media network 140A for presenting the selected content item is determined and provided to the user device 140A. In some embodiments, the configuration 606 indicates a mode and optionally an input source for each device needed for playing back the media content item. The user device 140A may, in turn, determine a sequence of commands for reaching the desired configuration and issues the commands to control 607 the media network. Alternatively, the iURL server 150 may determine the sequence of commands (e.g., based on the reported status of the user media device during step 605) which the user device issues to control 607 the media network.

FIG. 6B differs from FIG. 6A in that the user device determines the source device selections for playing the media content. Thus, for example, the iURL server 150 receives 611 an iURL selected on the user device 130 and parses 613 to resolve 615 the content referenced by the iURL. The iURL server 150 transmits information about the resolved content to the user device 130. The transmitted information may include the content providers on which the referenced media content is available. The user device 130 analyzes 617 the configuration of the user media network to determine 619 available sources on the user media network for playing back the content. The user device 130 then chooses 621, based on the current status of devices on the user media network and the devices from which the desired content is available, the target sources enabling content playback of the desired media content within the user media network 140 and transmits 623 playback and source device controls to effect content playback of the media content within the user media network. Thus, the user device may include all or a portion of the functionality of the network profiler 157 in which the configuration user media network is analyzed to determine which of the content sources should provide the media content and the state of source devices for playing the media.

Additionally, in some embodiments, the user media network 140 include a user media network helper coupled to source devices within the user media network to effect content playback. For example, if the user device 130 does not include IR capabilities, the media network helper may receive playback and device controls in another format from the user device 130 and transmit IR commands to source devices within the user media network 140 to enable content playback.

Additional Configuration Considerations

The iURL system may be expanded beyond media sharing solutions to incorporate a concept called "Internet of Things". Hence, the iURL can be applied to physical objects/devices that are Internet enabled or controllable through an internet enabled device such as a user's mobile device 140. Things such as light bulbs, garage doors, home appliances, and cars that are Internet enabled.

The iURL system can be expanded to incorporate the management and monitoring of the additional internet enabled devices. Once these devices are internet enabled, they will interact with each other since they are connected to the common grid (e.g., through communications through power lines to a hub or through IP communication. At that time, they will need a common addressing mechanism outside of the context in which they exist (home, office). Thus, for example, the iURL system may resolve a message from a neighbor's washing machine to inform other users' machines that a load exists on the system such that fewer users are creating high draws at the same time. Thus being able to reduce peak electricity loads as a community.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 1, 3, 4, 5, and 6) described herein may be performed, at least partially, by one or more processors (e.g., processor 202) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving user experience when sharing media content available from disparate sources. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    retrieving information about a plurality media content items available on disparate media sources;
    associating related media content items in the plurality of media content items to identify, for a given media content item, a plurality of the disparate media sources on which the given media item is available;
    storing configuration information about a first media network associated with a first user and configuration information about a second media network associated with a second user, the first media network comprising a first disparate media source in the plurality of the disparate media sources and the second media network comprising a second disparate media sources in the plurality of the disparate media source, the first disparate media source differing from the second disparate media source, and the first media network being different from the second media network;
    receiving status information describing media content playback for the first media network, the first media network playing the given media content item via the first disparate source;
    generating, responsive to the received status information, a reference to the given media content item playing on the first media network based on the status information for the first media network and the stored configuration information about the first media network;
    receiving a request for playing the media content item directly from a user device of the second user associated with the second media network, the request including the reference to the given media content item;
    determining, responsive to the received request, a configuration of the second media network for playing the given media content item via the second disparate source based on the stored configuration information about the second media network and the reference to the given media content item; and
    transmitting the configuration of the second media network to the user device of the second user for configuring the second media network to play the media content item via the second disparate media source.

2. The method of claim 1, wherein the reference to the given media content item is a Uniform Resource Locator (URL) describing a configuration of the first media network that causes playback of the given media content item identified from the received status information for the first media network and receiving the request associated with the second media network comprises receiving a connection request from the user device associated with the second media network at the URL.

3. The method of claim 2, further comprising parsing, in response to the connection request from the user device, the URL to identify the given media content item.

4. The method of claim 1, wherein determining the configuration of the second media network for playing the given media content item further comprises:
    receiving status information describing media content playback for the second media network; and
    determining the configuration of the second media network for playing the given media content item based on the status information for the second media network.

5. The method of claim 1, wherein determining the configuration of the second media network for playing the given media content item further comprises determining a first state for the second disparate media source and a second state for at least one other media source within the second media network that cause playback of the given media content item.

6. The method of claim 5, further comprising determining a sequence of commands for placing the second disparate media source in the first state and the at least one other media source within the second media network in the second state.

7. The method of claim 1, wherein associating related media content items in the plurality of media content items to identify, for a given media content item, a plurality of the disparate media sources on which the given media item is available comprises:
    determining a relationship between one or more media content items and the given media item in the plurality of media content items based on metadata associated with each media content item, the relationship indicating the given media content item and the one or more media content items are versions of a same media content item; and
    wherein the plurality disparate media sources on which the given media item is available are identified based on the relationship.

8. A system comprising:
    a server comprising a non-transitory computer readable storage medium comprising instructions executable by a processor to:
        store configuration information about a first media network associated with a first user and configuration information about a second media network associated with a second user, the first media network comprising a first disparate media source in a plurality of the disparate media sources available to provide a media content item for playback and the second media network comprising a second disparate media source in the plurality of the disparate media sources, the first disparate media source differing from the second disparate media source, the first media network being different from the second media network;
        receive status information describing media content playback for the first media network, the first media network playing the media content item via the first disparate source;
        generate, responsive to the received status information, a reference to the media content item playing on the first media network based on the status information for the first media network and the stored configuration information about the first media network;

receive a request for playing the media content item directly from a user device of the second user associated with the second media network, the request including the reference to the media content item;

determine, responsive to the received request, a configuration of the second media network for playing the media content item via the second disparate source based on the stored configuration information about the second media network and the reference to the given media content item; and transmit the configuration of the second media network; and the user device associated with the second user and coupled to the second media network, the user device comprising a non-transitory computer readable storage medium storing instructions executable by a processor to:

transmit the configuration information about the second media network to the server;

generate the request in response to detecting a selection of the reference;

receive the configuration of the second media network for playing the media content item via the second disparate source; and transmit one or more commands to configure the second media network to play the media content item via the second disparate media source.

9. The system of claim 8, wherein the reference to the media content item is a Uniform Resource Locator (URL) describing a configuration of the first media network that causes playback of the media content item identified from the status information for the first media network and receiving the request associated with the second media network comprises receiving a connection request from the user device associated with the second media network at the URL.

10. The system of claim 9, further comprising parsing, in response to the connection request from the user device, the URL to identify the media content item.

11. The system of claim 8, wherein determining the configuration of the second media network for playing the media content item further comprises:

receiving status information describing media content playback for the second media network; and determining the configuration of the second media network for playing the media content item based on the status information for the second media network.

12. The system of claim 8, wherein determining the configuration of the second media network for playing the media content item further comprises determining a first state for the second disparate media source and a second state for at least one other media source within the second media network that cause playback of the media content item.

13. The system of claim 12, further comprising determining a sequence of commands for placing the second disparate media source in the first state and the at least one other media source within the second media network in the second state, and wherein the transmitted configuration of the second media network includes the sequence of commands.

14. The system of claim 8, wherein the server further comprises instructions executable by a processor to:

determine a relationship between a set of media content items based on metadata associated with each media content item in the set, the relationship indicating the set of media content items are versions of same media content, the set of media content items including the media content item; and determine, based on the relationship of the media content item indicating versions of same media content, a version of same media content available on the second disparate source to playback on the media content item via the second disparate source.

15. A method comprising:

receiving, from a first user device associated with a first media network, a request to share media content playback of the first media network, the first media network playing a media content item;

receiving, from the first user device associated with the first media network, status information describing media content playback for the first media network on one or more source devices within the first media network enabling playback of the media content item;

generating, responsive to the request and the received status information, a Uniform Resource Locator (URL) referencing the media content item playing on the first media network based on the status information for the first media network and stored configuration information about the first media network;

receiving a connection request directly from a second user device associated with a second media network by way of the URL referencing the media content item, the second media network different from the first media network;

parsing, responsive to the connection request, the URL to identify the referenced media content item;

analyzing stored configuration information about the second media network to determine a configuration of one or more source devices within the second media network for playing a version of the referenced media content item, at least one source device within the second media network differing from a source device in the first media network for playing the media content item;

transmitting the configuration of the one or more source devices within the second media network for playing the version of the referenced media content item to the second user device associated with the second media network.

16. The method of claim 15, wherein the URL describes a configuration of the first media network that causes playback of the media content item identified from the status information for the first media network.

17. The method of claim 15, wherein analyzing stored configuration information about the second media network to determine a configuration of one or more source devices within the second media network for playing a version of the referenced media content item further comprises:

receiving status information describing media content payback for the second media network on the one or more source devices within the second media network; and determining the configuration of the one or more source devices within the second media network for playing the version of the referenced media content item based on the status information for the second media network.

18. The method of claim 15, wherein analyzing stored configuration information about the second media network to determine a configuration of one or more source devices within the second media network for playing a version of the referenced media content item further comprises determining a state for each of the source of more source devices within the second media network to cause playback of the version of the referenced media content item.

19. The method of claim 18, further comprising:
receiving status information describing media content payback for the second media network on the one or more source devices within the second media network;
determining, based on the status information for the second media network, a current state of the one or more source devices within the second media network; and
determining a sequence of commands for placing each of the one or more source devices within the second media network in their determined state to cause playback of the version of the referenced media content item from their current state.

20. The method of claim 15, further comprising
determining a relationship between a set of media content items based on metadata associated with each media content item in the set, the relationship indicating the set of media content items are versions of same media content, the set of media content items including the media content item; and
determining, based on the relationship of the media content item indicating versions of same media content, the version of the referenced media content item available on the at least one source device within the second media network.

* * * * *